(12) United States Patent
Chen

(10) Patent No.: US 6,319,300 B1
(45) Date of Patent: Nov. 20, 2001

(54) FILTER ASSEMBLY OF AN AIR FILTER

(76) Inventor: Liou-Win Chen, P.O. Box 96-405, Taipei 106 (TW)

( * ) Notice: Subject to any disclaimer, the term of this patent is extended or adjusted under 35 U.S.C. 154(b) by 0 days.

(21) Appl. No.: 09/615,254

(22) Filed: Jul. 12, 2000

(51) Int. Cl.[7] .................................................. B01D 27/08
(52) U.S. Cl. .......................... 55/497; 55/385.3; 55/492; 55/502; 55/510; 55/511; 55/521; 55/DIG. 31
(58) Field of Search .................... 55/385.3, 492, 55/497, 499, 500, 501, 510, 511, 521, 502, DIG. 31

(56) References Cited

U.S. PATENT DOCUMENTS

| | | | |
|---|---|---|---|
| 2,709,489 | * | 5/1955 | Keebler ........................... 55/DIG. 31 |
| 3,183,286 | * | 5/1965 | Harms ............................. 55/DIG. 31 |
| 5,059,218 | * | 10/1991 | Pick ................................ 55/DIG. 31 |
| 5,531,892 | * | 7/1996 | Duffy .............................. 55/DIG. 31 |
| 5,618,324 | * | 4/1997 | Sommer et al. ................ 55/DIG. 31 |
| 5,879,423 | * | 3/1999 | Luka et al. ...................... 55/DIG. 31 |
| 5,968,217 | * | 10/1999 | Stein et al. ...................... 55/DIG. 31 |
| 5,980,600 | * | 11/1999 | Stopyra et al. ................. 55/DIG. 31 |
| 5,989,303 | * | 11/1999 | Hodge ............................ 55/DIG. 31 |

* cited by examiner

*Primary Examiner*—David A. Simmons
*Assistant Examiner*—Minh-Chau T. Pham

(57) ABSTRACT

A filter assembly of an air filter, which includes a corrugated filter sheet, and both ends thereof are mounted in a clamp space between two rows of corrugated positioning grooves of the upper and lower clamp plates of a horizontal lintel; both sides thereof are clamped in two vertical jambs respectively; the corner ends of the horizontal lintel and the vertical jamb are connected together by using a connection plate to plug therein; then, the outer surface of the filter assembly and the corner ends will be pressed and punched to have the horizontal lintels, the vertical jambs, and the filter sheet fastened together to form into a filter for screening dust.

9 Claims, 10 Drawing Sheets

FILTER ASSEMBLY OF AN AIR FILTER

BACKGROUND OF THE INVENTION

1. Field of the Invention

This invention relates to an air filter, and particularly to a filter assembly of an air filter.

2. Description of the Prior Art

A conventional air filter of a car usually comprises a fixed frame made of a metal sheet punched into form, and the inner edge thereof is glued with a cotton filter, which is a flat cotton sheet to be punched and folded into a corrugated filter net, or a cylindrical filter; conventionally, the air filter is merely mounted in place with a glue, and is fitted in a given container to prevent the cotton filter from being hit or damage.

To prevent from being damaged by impact, both sides of a cotton filter are covered with metal screens respectively; then, the cotton filter is cut into a suitable size to be pressed into a corrugated filter sheet, which is to be put in a mold cavity; by means of a thermal molding, the edge of the filter sheet is glued with a rubber frame, and the rubber frame is mounted in a mounting cavity of an air filter. Since the time for forming a rubber frame around the filter sheet is much long, the edge portion of the filter net is subject to being covered by the thermal rubber material; in that case, the ventilation capability would be affected.

SUMMARY OF THE INVENTION

The prime object of the present invention is to provide a filter sheet, of which both sides of the cotton filter are covered with a metal screen; the filter sheet is then cut into a suitable size, and is pressed into a corrugated sheet to be mounted in a clamp space between an upper clamp plate and a lower clamp plate of two horizontal lintels; both sides thereof are mounted between two vertical jambs. The corner ends of the horizontal lintel and the vertical jamb are connected together by using a connection plate so as to form into a complete air filter.

Another object of the present invention is to provide a filter assembly of an air filter, in which the upper clamp plate and the lower clamp plate on both sides of the clamp space between two horizontal lintels are furnished with a plurality of corrugated positioning grooves respectively for receiving the corrugated filter sheet; after the aforesaid parts being assembled together, a pressing and punching process should be done so as to have the corrugated filter sheet mounted in place firmly between the upper clamp plate and the lower clamp plate.

Still another object of the present invention is to provide a filter assembly of an air filter, in which the corner ends of the horizontal lintel and the vertical jamb are furnished with hollow grooves respectively for receiving a connection plate; after the upper and lower clamp plates of the horizontal lintel are clamped towards the filter sheet, the horizontal lintel and the vertical jamb will be punched and riveted together as one piece.

A further object of the present invention is to provide a filter assembly of an air filter, in which the upper and lower frame sides of the horizontal lintels extend an upper and lower clamp plates respectively. Both the upper and lower clamp plates are furnished with a plurality of corrugated positioning grooves. After the clamp space between the upper and lower clamp plates is mounted with a corrugated filter sheet, a pressing and a punching steps will be processed so as to fasten the ends of the corrugated filter sheet in the positioning grooves firmly.

A still further object of the present invention is to provide a filter assembly of an air filter, in which the inner ends of the upper and lower frame sides have straight surfaces, and a clamp space is formed between the two straight surfaces; both ends thereof are furnished with an upper and a lower fastening plates for holding the corrugated filter sheet therein. The corner ends of the horizontal lintel and the vertical jamb are connected together with a L-shaped connection plate and screws so as to have the corrugated filter sheet fastened in the horizontal lintel and the vertical jamb firmly.

Yet another object of the present invention is to provide a filter assembly of an air filter, in which the fixed frame includes horizontal lintels and vertical jambs; the outer ring edge of the fixed frame is covered with a rubber cover so as to facilitate the filter assembly to mount in the mounting cavity of an air filter.

Yet still another object of the present invention is to provide a filter assembly of an air filter, in which the fixed frame includes horizontal lintels and vertical jambs; the outer ring edge of the fixed frame is attached with a foam rubber belt so as to have the filter assembly had a resilient foam rubber frame to be fitted in the mounting cavity of an air filter.

Yet a further object of the present invention is to provide a filter assembly of an air filter, in which the corrugated filter assembly includes a cotton filter sandwiched between two layers of metal screens; both sides of the cotton filter are covered with an edge strip; after the filter assembly is inserted in the clamp space of the horizontal lintels, the filter assembly will be in close contact with the inner surface of the straight plate of the horizontal lintels.

DETAILED DESCRIPTION OF THE PREFERRED EMBODIMENT

Figure 1:
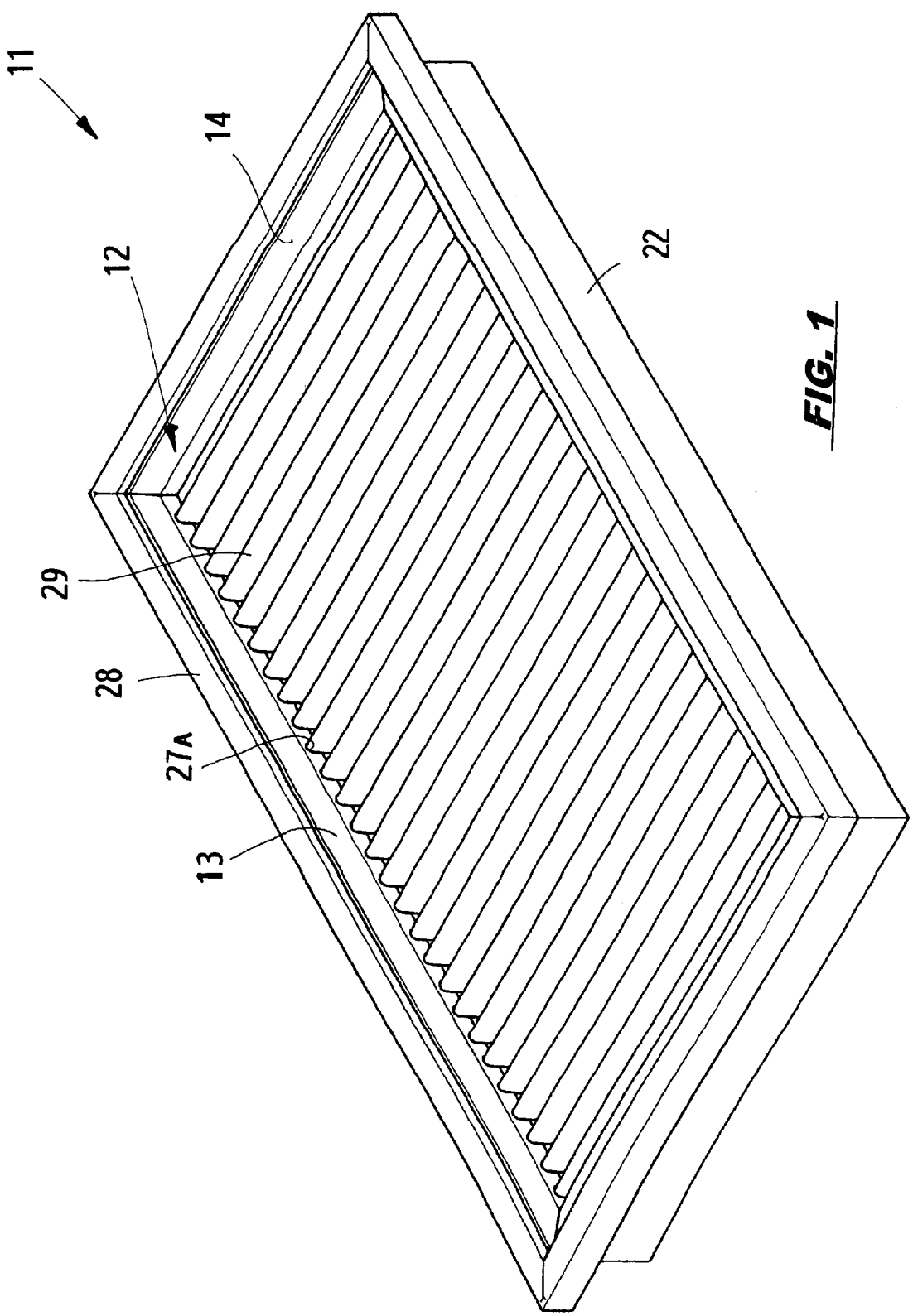
FIG. 1 is a perspective view of a filter assembly according to the present invention.
Figure 2:
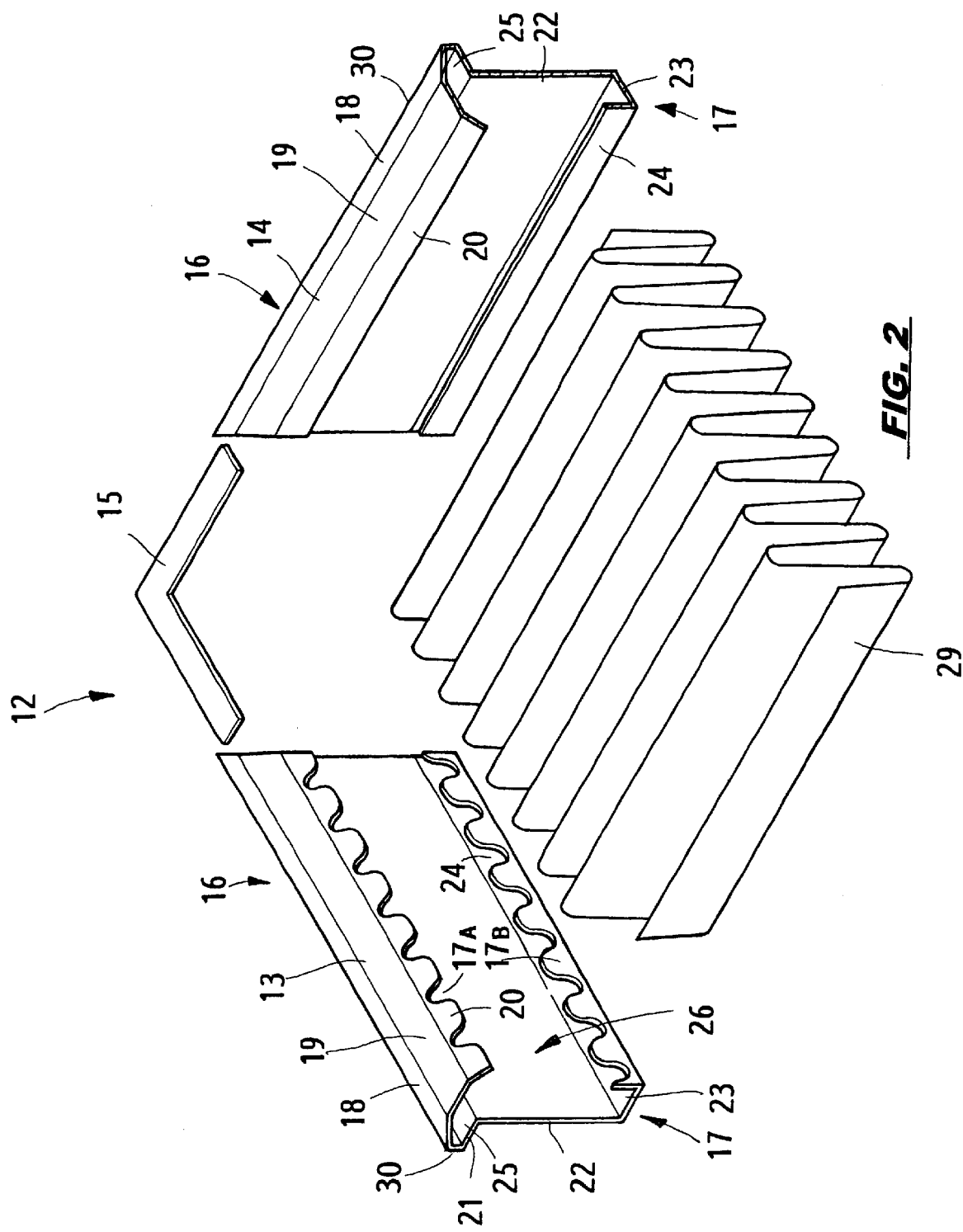
FIG. 2 is a disassembled view of the present invention, showing the corner portion structure of the filter assembly.
Figure 3:
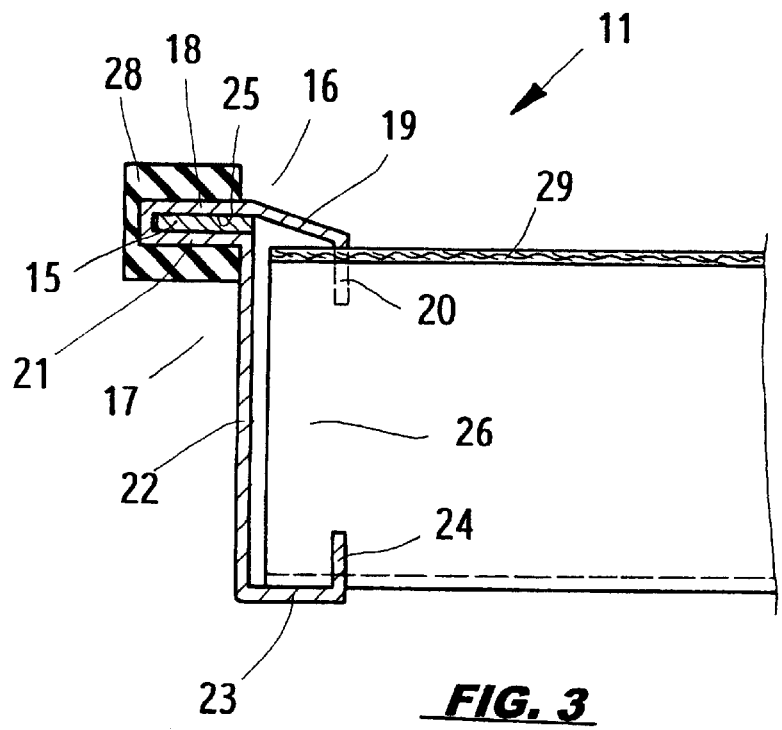
FIG. 3 is a sectional view of the present invention, showing the fastening structure between the filter sheet and the fixed frame.
Figure 4:
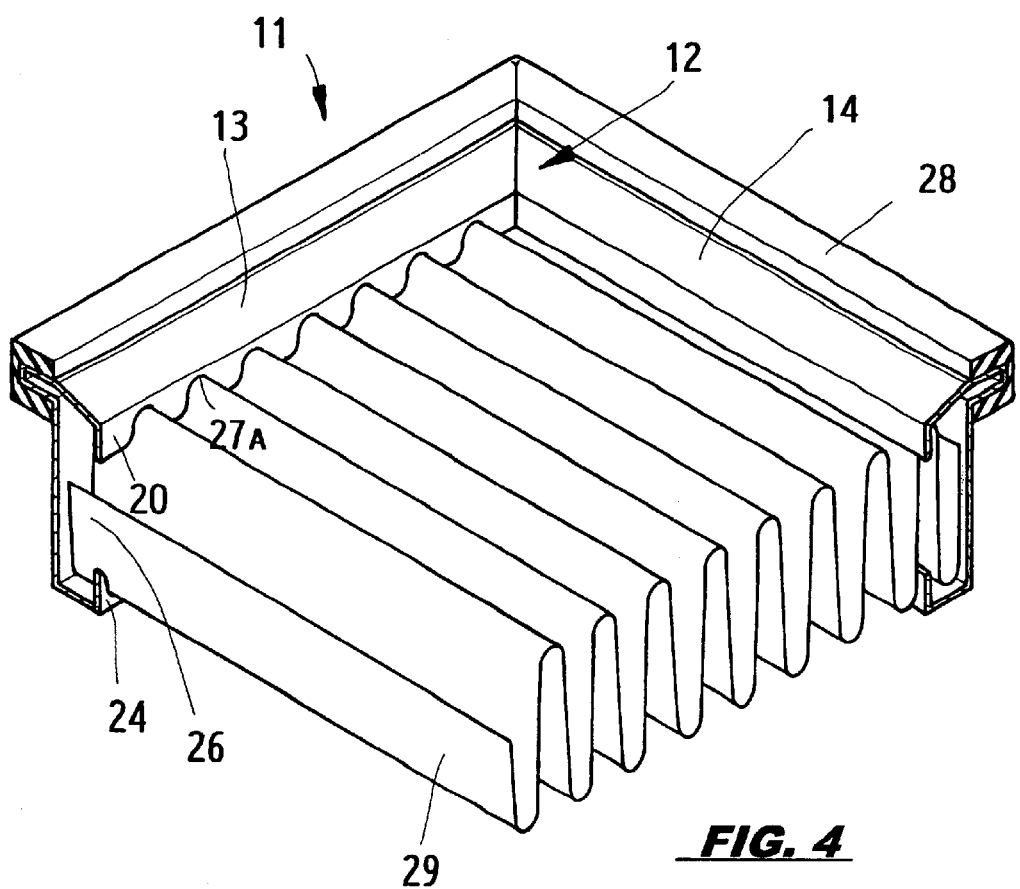
FIG. 4 is a fragmental perspective view of the present invention, showing the assembling structure between the filter sheet and the fixed frame.

This invention relates to a filter assembly of an air filter as shown in FIGS. 1 and 2;

the filter assembly 11 includes a filter sheet 29 having a suitable length and width. The filter sheet 29 is substantially a corrugated sheet, of which both ends are fastened between the upper clamp plate 20 and the lower clamp plate 24 of a horizontal lintel 13; both sides thereof are mounted in a vertical jamb 14. The horizontal lintel 13 and the vertical jamb 14 are connected together by means of a L-shaped connection plate 15 through a punching operation so as to fasten the filter sheet 29 in a rectangular fixed frame 12, of which the edge is covered with a resilient cover 28; the filter assembly 11 is to be mounted in a hole of a car filter.

Figure 8:
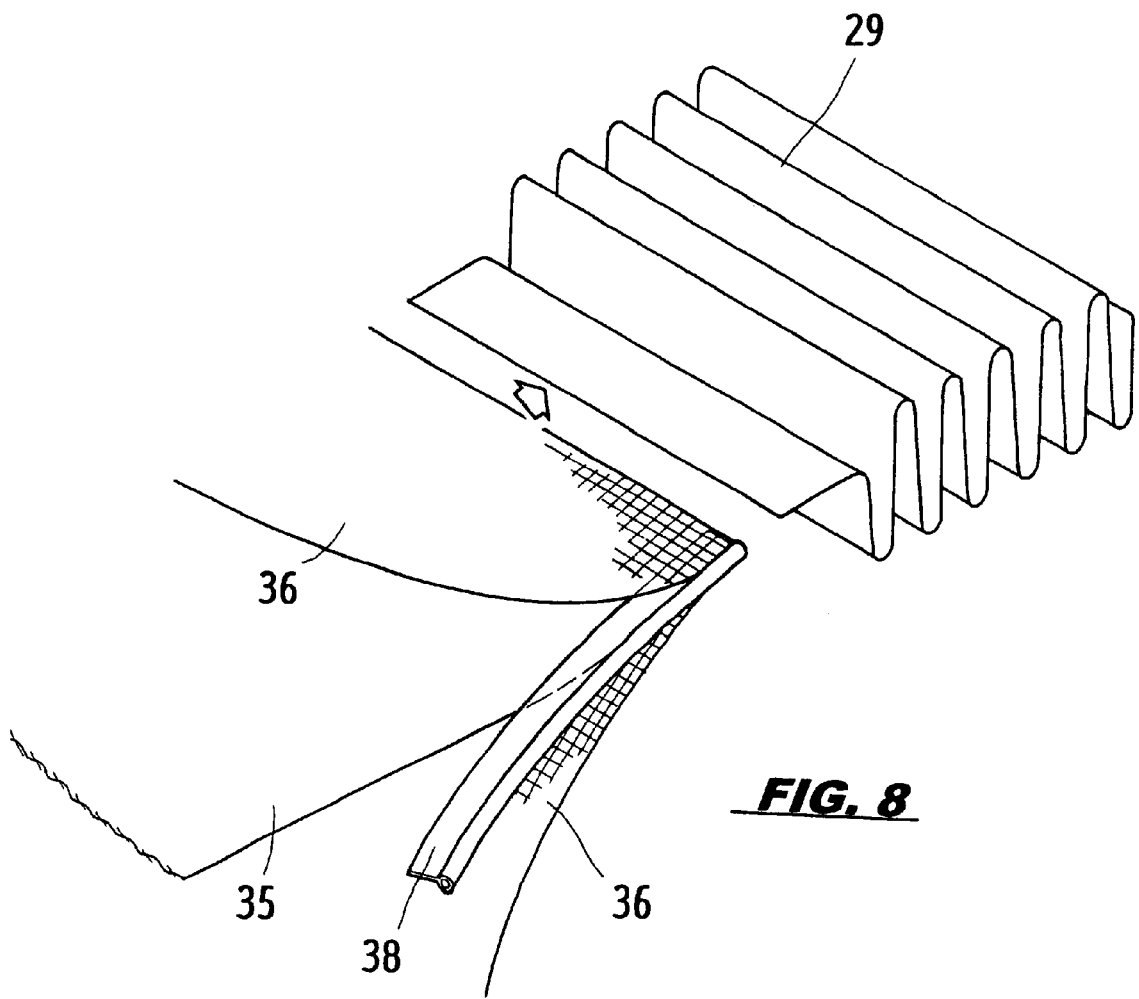
FIG. 8 is a perspective view of the present invention, showing the corrugated filter sheet being clamped and covered in place.

As shown in FIGS. 1 and 8, the filter sheet 29 of the fixed frame 12 includes a cotton filter 35 having upper and lower sides clamped with metal screens 36 respectively for filtering fine dust. Both ends of the cotton filter 35 are mounted with resilient edge strips 38 respectively to form into a filter sheet covered with a metal screen; then, the filter sheet is cut into a piece with a suitable length and width, and formed into a corrugated filter sheet 29, of which both ends have corrugated ends to be plugged into the horizontal lintel 13 of the fixed frame 12 closely. Both ends of the filter sheet 29 are flat surfaces respectively to be connected with the vertical jamb 14 of the fixed frame 12.

As shown in FIGS. 1 to 7, the corrugated filter sheet 29 is to be mounted in a fixed frame 12, which includes two horizontal lintels 13, two vertical jambs 14 and connection plates 15. The horizontal lintel 13 and the vertical jamb 14 are made of metal sheet; the outer edges of the lintel 13 and the jamb 14 are formed into flat plates 18 and 21 respectively to form into an outer ring edge 30. Under the flat plates 18 and 21, there are hollow grooves 25 respectively for receiving a L-shaped connection plate 15 so as to punch into a fixed frame 12.

Every upper flat plate 18 is furnished with an arm plate 19 and a clamp plate 20 extended inwards to form into an upper frame side 16 of the lintel 13 and the jamb 14. The lower flat plate 21 of the outer ring edge 30 extends out with a vertical plate 22, an inner plate 23 and a clamp plate 24 so as to form into a lower frame side 17. The distance between the upper clamp plate 20 and the lower clamp plate 24 of the two frame sides 16 and 17 is designed in accordance with the height of the corrugated filter sheet 29. Before the horizontal lintel 13 and the vertical jamb 14 being assembled together, the distance between the two clamp plates 20 and 24 should be slightly higher than the height of the filter sheet 29; during pressing and assembling operation, the corrugated filter sheet 29 will be clamped firmly in the positioning grooves 27 of he clamp plates 20 and 24 without moving.

Figure 5:
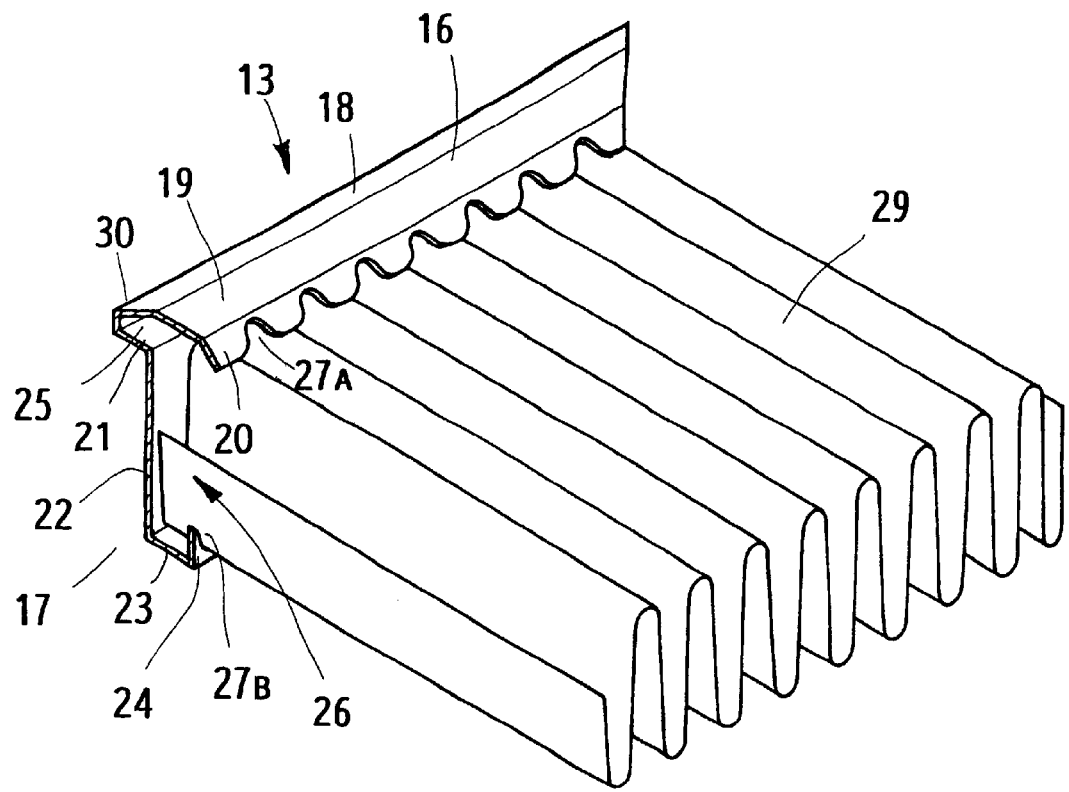
FIG. 5 is a fragmental perspective view of the present invention, showing the fastening structure between the filter sheet and the fixed frame.

Before a metal sheet being pressed and rolled into a form of the horizontal lintel 13, both ends of the metal sheet should be punched into a plurality of corrugated positioning grooves 27. After the elongate frame is pressed into form, the tail ends of the clamp plates 20 and 24 of the upper and lower frame sides 16 and 17 will have a plurality of alternate and opposite corrugated positioning grooves 27A and 27B respectively; as shown in FIG. 5, the distance between the two clamp plates 20 and 24 of the upper and lower frame sides 16 and 17 is slightly larger than the height of the filter sheet 29 before the horizontal lintel 13 and the vertical jamb 14 being assembled together; therefore, the two horizontal lintels 13 can easily be assembled together with the two ends of the filter sheet 29.

The vertical jamb 14 pressed into form with metal sheet is completely the same in structure, as the horizontal lintel 13 except the positioning grooves 27 on the tail ends of the clamp plates 24 and 24 of the upper and lower frame sides 16 and 17. The open clamp space 26 of the vertical jamb 14 can be assembled directly with the two ends of the filter sheet 29 so as to have the filter sheet 29 guided into the clamp space between the upper and lower frame sides.

The parts of the fixed frame 12 have been cut at a regular size in advance; the clamp plates 20 and 24 of the upper and lower frame sides 16 and 17 of the horizontal lintel 13 are furnished with alternate and opposite positioning grooves 27A and the positioning grooves 27B; the distance between the positioning grooves 27A and the positioning grooves 27B is larger than the height of the filter sheet 29, and therefore the bottom edge of the corrugated filter sheet 29 can easily be fitted into the positioning grooves 27B of the lower clamp plate 24; then, both sides of the filter sheet 29 can be fitted together with the vertical jamb 14. The connecting corner between the horizontal lintel 13 and the vertical jamb 14 is connected together by plugging a L-shaped connection plate 15 into a hollow groove 25 between the two flat plates 18 and 21 of the outer ring edge 30 so as to complete the assembling operation between the filter assembly 11 and the fixed frame 12.

Figure 6:
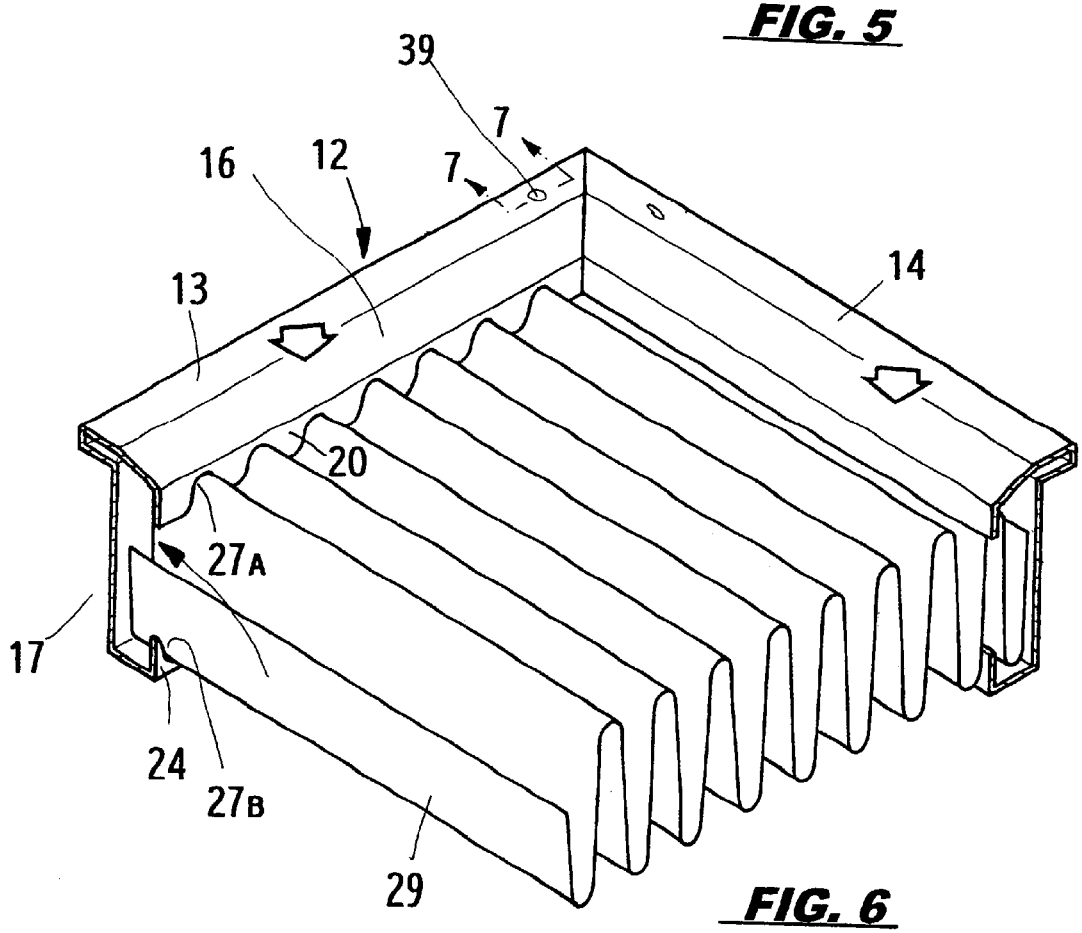
FIG. 6 is a perspective view of the present invention, showing the fixed frame assembled into one piece.
Figure 7:
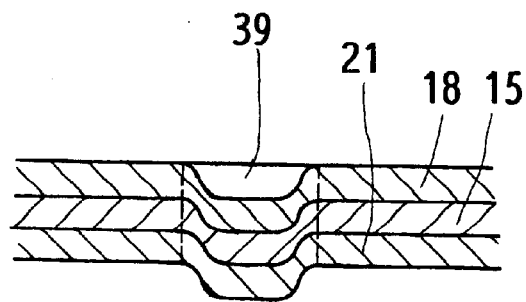
FIG. 7 is a sectional view of the present invention, showing a sectional view along line 7—7 in FIG. 6.

As shown in FIGS. 6 and 7, the fixed frame 12 has to be pressed after the filter assembly 11 being assembled into form, i.e., the open clamp plate 20 must be pressed down so as to have the positioning grooves 27A of the clamp plate 20 and the upper surface of the filter sheet contacted closely, and to prevent the filter sheet 29 from shifting and moving. The corner portion between the horizontal lintel and vertical jamb 14 is pressed into a recess spot of fastening point 39, i.e., the two flat plates 18 and 21 and the connection plate 15 are punched and pressed together to have the parts of the filter assembly 11 assembled together.

The fixed frame 12 with a filter sheet 29 has an outer ring edge 30 to be fitted with the port of an air filter hermetically. The outer ring edge 30 of the fixed frame 12 is covered with a resilient cover 28, which is made of rubber, or of a foam rubber belt attached along the flat plates 18 and 21 so as to have the filter assembly mounted in place hermetically.

Figure 9:
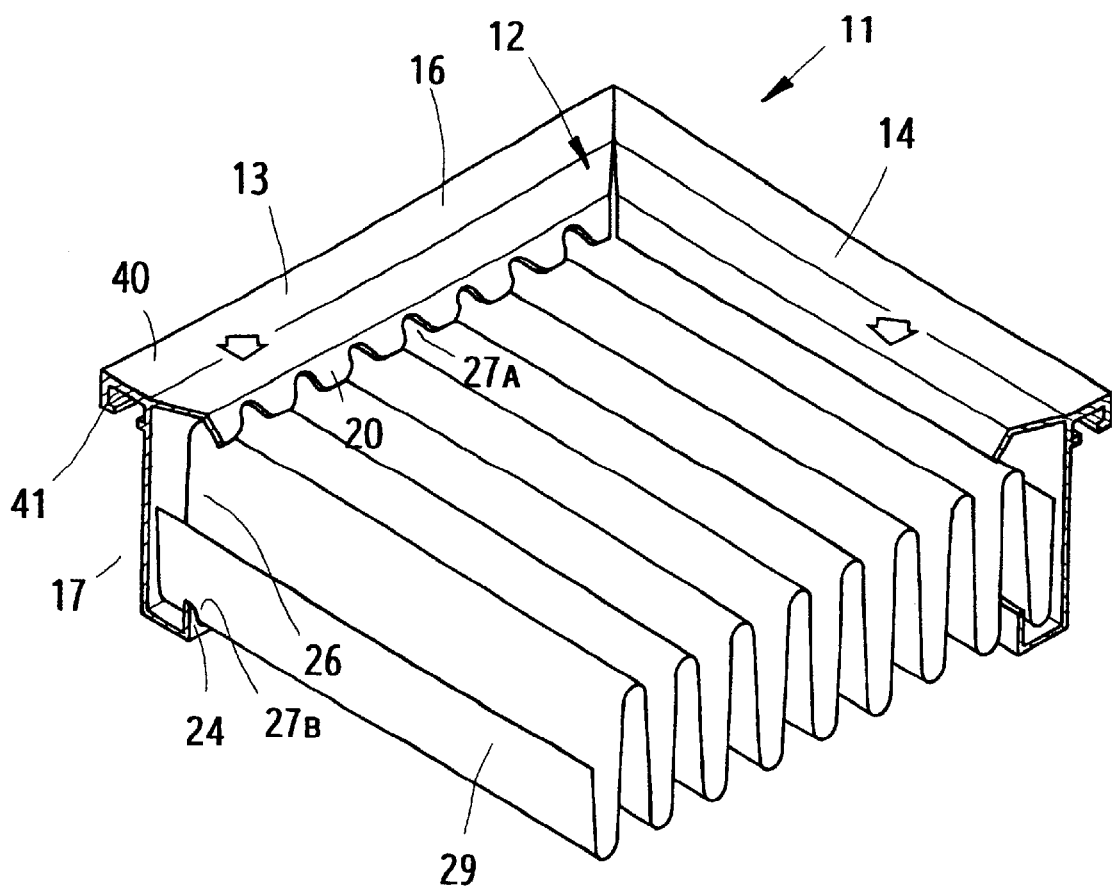
FIG. 9 is a fragmental perspective view of the present invention, showing the second embodiment of the fixed frame.
Figure 10:
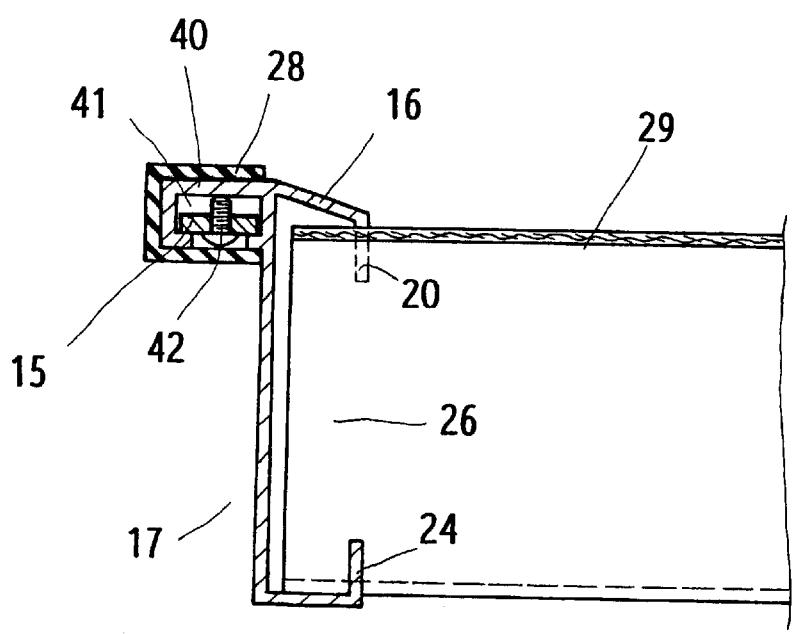
FIG. 10 is a sectional view of the present invention, showing the assembling structure between the filter sheet and the fixed frame.

As shown in FIGS. 9 and 10, the horizontal lintel 13 and the vertical jamb 14 of the fixed frame are made of aluminum by extrusion molding, and then are cut in a size desired; the structure of the horizontal lintel 13 and the vertical jamb 14 is almost the same as that of the aforesaid embodiment except the outer ring edge 40 thereof, which is substantially a single plate; the lower side of the single plate has a plugging groove 41 for receiving the L-shaped connection plate 15, which is then fixed in place with screws 42. The positioning grooves 27B on the clamp plate 24 of the lower frame side 17 of the two horizontal lintels 13 are in close contact with the lower edges of both ends of the corrugated filter sheet 29; both sides of the filter sheet 29 are mounted in the two vertical jambs 14 respectively. The corner plugging grooves 41 of the horizontal lintel 13 and the vertical jamb 14 are plugged with the L-shaped connection plate 15 which is to be fastened in place with screws 42. After the fixed frame 12 is assembled, the upper edge of the filter sheet 29 and the positioning grooves 27A of the clamp plate 20 should be fastened together by merely pressing the clamp plate 20 of the upper frame side 16 down to the upper edge of the filter sheet 29 so as to fasten the filter sheet 29 in place. The outer ring edge 40 of the fixed frame 12 is covered with a resilient cover 28 so as to facilitate the outer ring edge 40 to be mounted on the port of the air filter.

Figure 11:
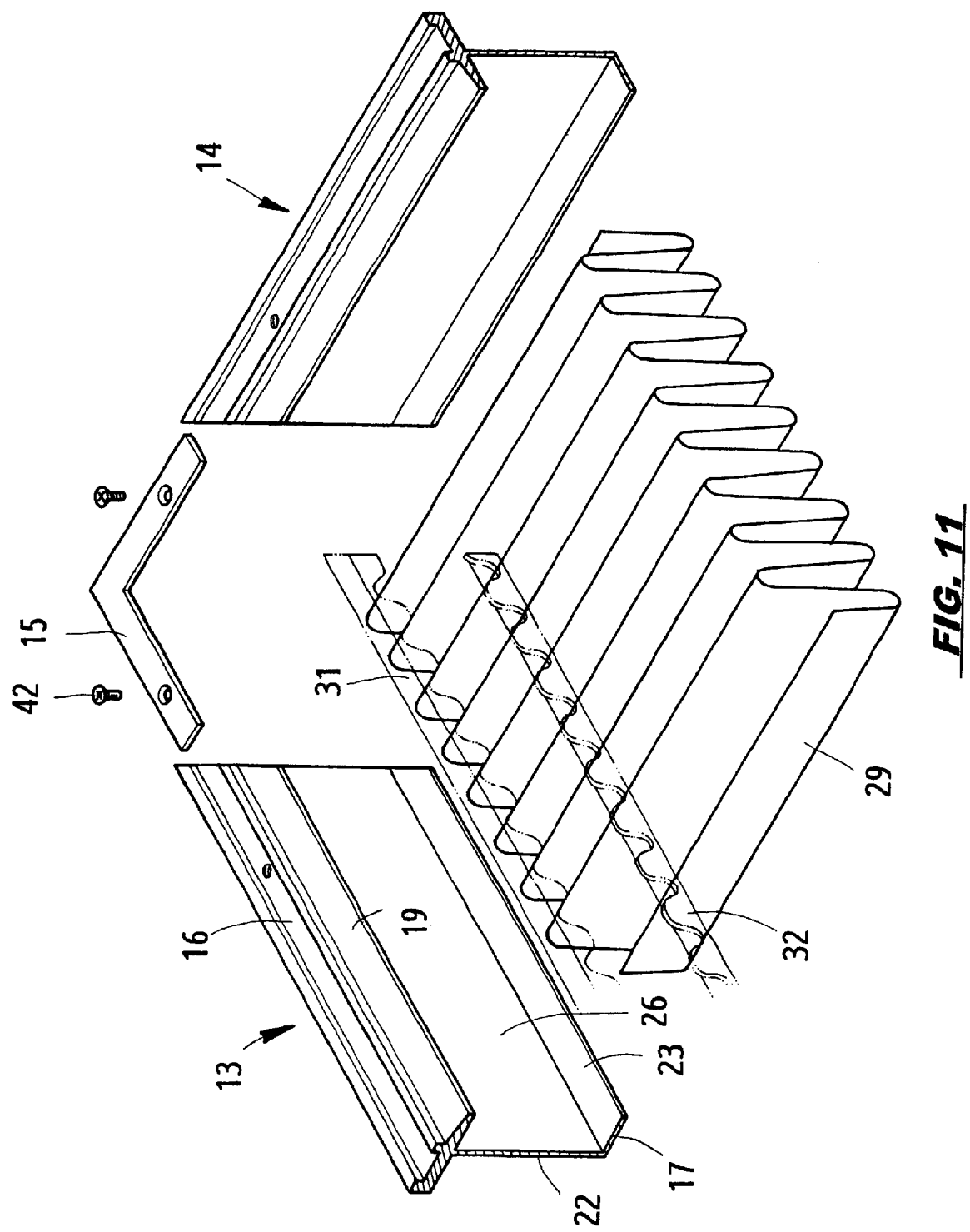
FIG. 11 is a disassembled view of the present invention, showing the third embodiment of the fixed frame.
Figure 12:
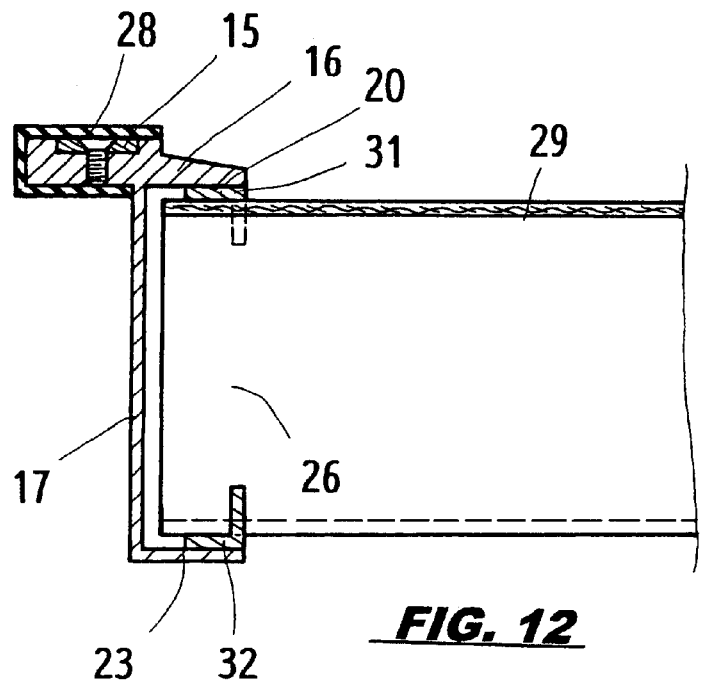
FIG. 12 is a sectional view of the present invention, showing the assembling structure between the filter sheet and the fixed frame.
Figure 13:
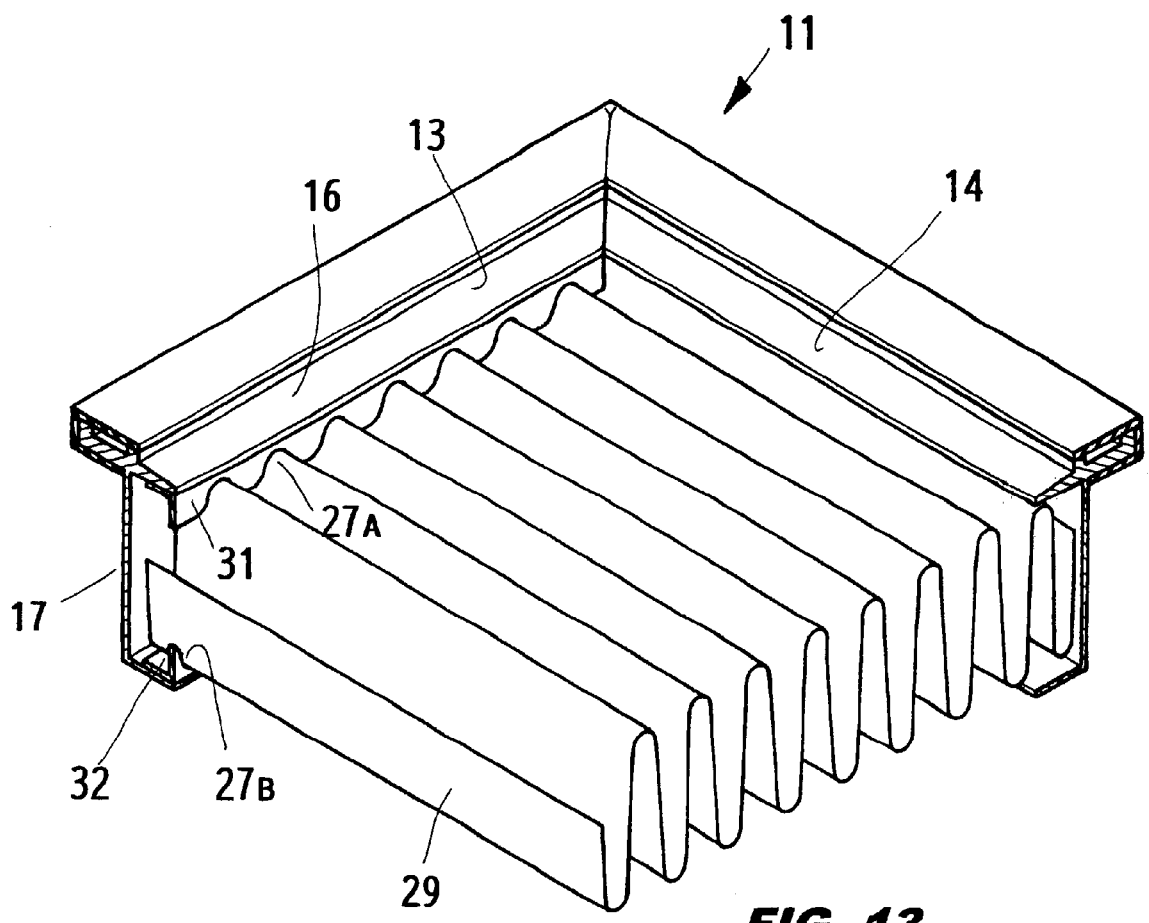
FIG. 13 is a fragmental perspective view of the present invention, showing the assembling structure between the filter sheet and the fixed frame.

As shown in FIGS. 11 to 13, the horizontal lintel 13 and the vertical jamb 14 of the fixed frame 12 are made of aluminum by extrusion molding, and cut into a size desired; the inner edges of the upper frame side 16 and the lower frame side 17 are not extended towards the clamp space 26 as mentioned in the aforesaid embodiment to form into the clamp plates 20 and 24 respectively, i.e., the upper and lower plates are an open type. After both ends of the corrugated filter sheet 29 are plugged into the clamp space 26 of the horizontal lintel 13, two separated fastening plates (the upper and the lower) 31 and 32 are mounted to the upper and lower edges of the corrugated filter sheet 29, and then the two separated fastening plates are plugged into the clamp space 26 of the horizontal lintel 13 respectively; the two sides of the filter sheet 29 are assembled together with the vertical jamb 14 so as to form into a rectangular fixed frame 12; the corner ends of the horizontal lintel 13 and the vertical jamb 14 are connected together by using a L-shaped connection plate 15, which is then fixed in place with screws. The top and bottom surfaces of the outer ring edge 30 of the fixed frame 12 are covered with a resilient cover 28 so as to provide the filter assembly 11 with a resilient frame to be mounted in the port of the air filter hermetically.

Figure 14:
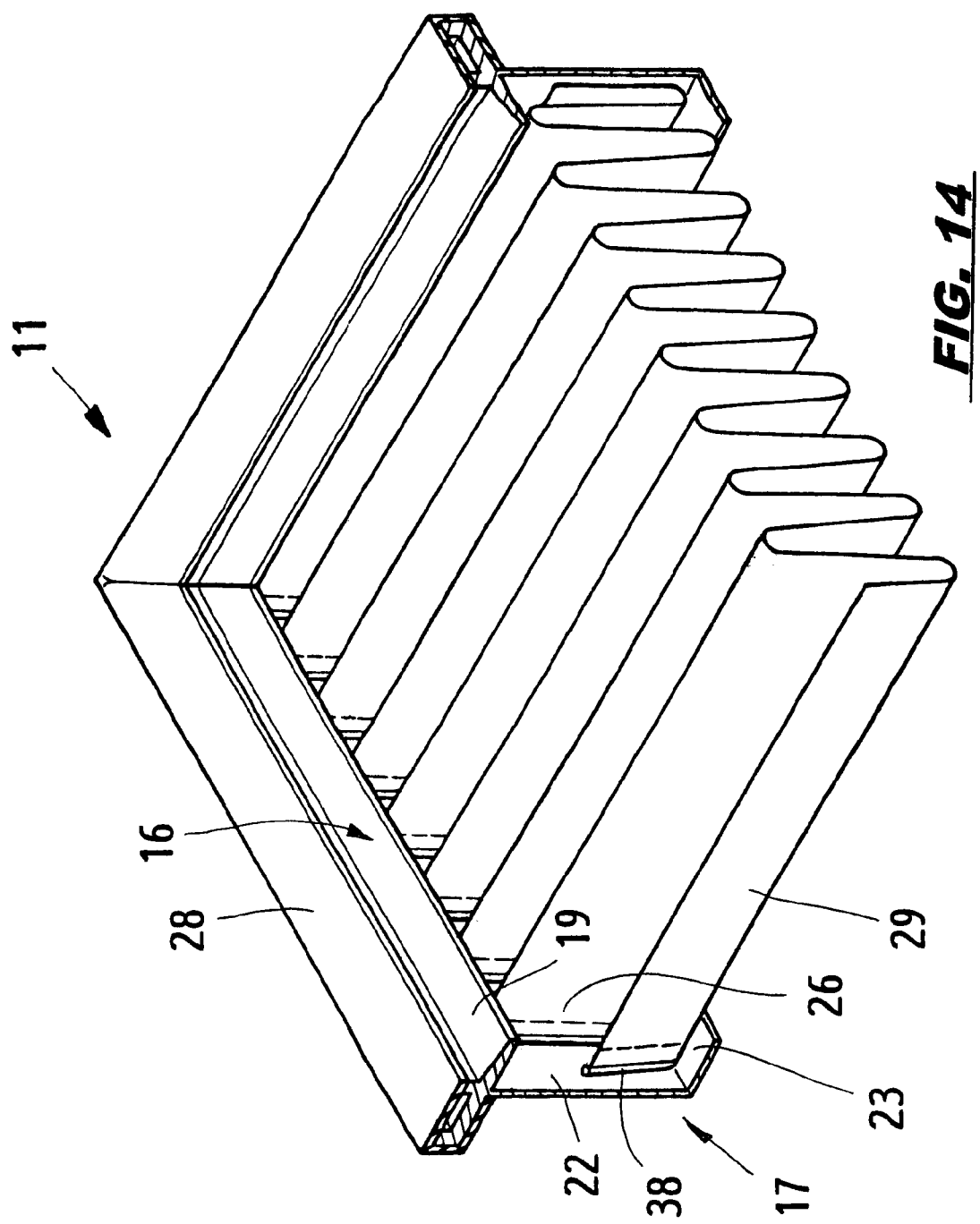
FIG. 14 is a fragmental section view of the present invention, showing the structural relation between the fixed frame and the filer sheet of the fourth embodiment.

As shown in FIGS. 8 and 14, the structure of the horizontal lintel 13 and the vertical jamb 14 of the fixed frame 12 is the same as that of the aforesaid embodiment; the clamp space 26 between the upper clamp plate 20 and the lower clamp plate 24 in the upper and lower frame sides 16 and 17 is an open type. As shown in FIG. 8, the edge of the filter sheet 29 is mounted with a resilient edge strip 38, which will be in close and resilient contact with the vertical plate 22. The metal screen 36 mounted between the upper and lower sides of the cotton filter 35 of the filter sheet 29 has a relative rigid surface, and it is bent and cut into a given size before being plugged into the clamp space 26 between the horizontal lintel 13 and the vertical jamb 14 so as to form into a rectangular fixed frame 12. The filter sheet 29 is a net having a higher rigidity; both ends thereof are attached with edge strips 38 respectively. After the horizontal lintel 13 and the vertical jamb 14 are assembled together, the fixed frame 12 can be fitted in the port of an air filter.

Figure 15:
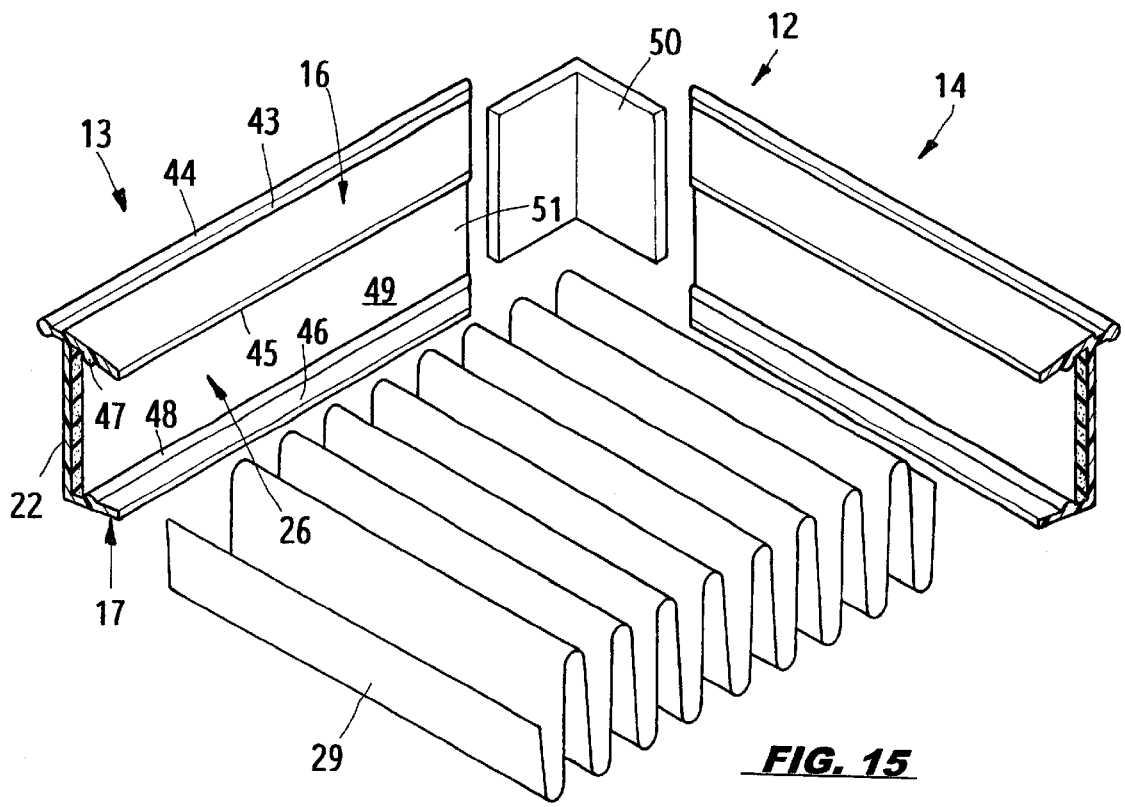
FIG. 15 is a disassembled view of the present invention, showing the forth embodiment of the fixed frame.
Figure 16:
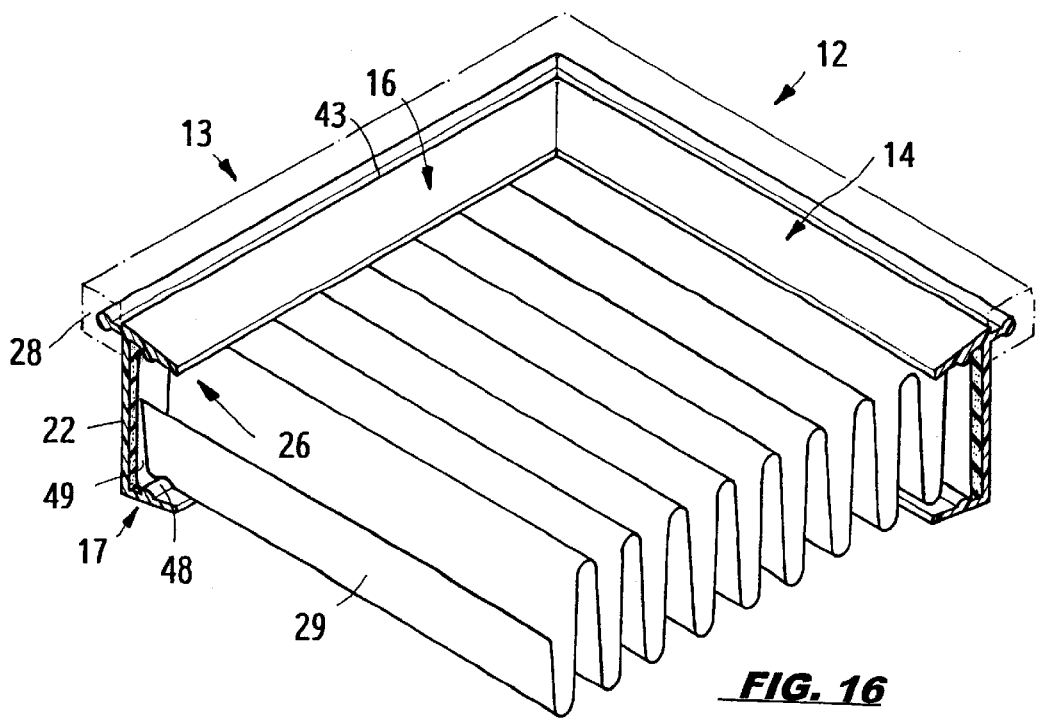
FIG. 16 is a fragmental perspective view of the present invention, showing the assembling structure between the filter sheet and the fixed frame.

As shown in FIGS. 15 and 16, the upper frame sides 16 of the horizontal lintel 13 and vertical jamb 14 of the fixed frame 12 are provided with small flat plates 43 respectively extended outwards, while the tail end thereof is formed into a cylindrical side post 44; the inner sides of the upper and lower clamp surfaces 45 and 46 in the clamp space 26 between the upper and lower frame sides 16 and 17 are furnished with positioning salient strips 47 and 48 respectively near the ends of the vertical plates 22. Before cutting the frame into a suitable size, the inner side of the vertical plate 22 is glued first with a lower-density foam rubber plate 49; after cutting, the inner sides of the vertical plates 22 of the lintel and jamb 13 and 14 are already glued with foam rubber 49. The corner ends of the lintel and jamb 13 and 14 are plugged with the ends of the filter sheet 29 through a small slot of the upper and lower clamp surfaces 45 and 46 of the clamp space 26 between the vertical plates 22; then, the end surface of the filter sheet 29 is in contact with the foam rubber, while the positioning salient strips 47 and 48 of the upper and lower clamp surfaces 45 and 46 of the clamp space 26 will clamp the upper and lower edges of the filter sheet 29 in place. The corner ends of the lintel 13 and the jamb 14 will be inserted and connected together by means of both sides of the connection plate 50 and the plugging grooves 51 in the clamp space 26 so as to have the filter sheet 29 and the fixed frame 12 assembled together. The positioning salient strips 47 and 48 on the upper and lower clamp surfaces 45 and 46 of the clamp space between the lintel and jamb 13 and 14 and the foam rubber plate 49 glued to the inner surface of the vertical plate 22 will provide the ends of the filter sheet 29 with positioning clamp and a close contact of the ends thereof; the ends of the frame have plugging grooves 51 for receiving the connection plate to facilitate the assembling operation. The cylindrical side post 44 on the outer tail end of the upper frame side 16 can provide a better connection upon the resilient cover 28 being inserted in place so as to have the resilient cover 28 and the fixed frame 12 fastened together completely.

According to the aforesaid embodiment, the structure of the present invention includes a horizontal lintel 13 and a vertical jamb 14 made of metal; the inner clamp plates 20 and 24 thereof are furnished with corrugated positioning grooves 27, which include a plurality of upper positioning grooves 27A, and of lower positioning grooves 27B arranged in alternate and opposite manner so as to facilitate the corrugated filter sheet 29 to plug and fasten in place. The corner ends of the horizontal lintel 13 and the vertical jamb 14 are connected together by means of a L-shaped connection plate 15 so as to form into a fixed frame 12. The outer ring edge 30 of the fixed frame 12 is covered with a resilient cover 28 so as to facilitate the filter assembly 11 to be mounted in a port of an air filter of a car. Since the fixed frame 12 is made of metal, it enables the corrugated filter sheet 29 to be assembled and mounted in place quickly and simply.

What is claimed is:
1. A filter assembly of an air filter comprising:
   a fixed frame including two horizontal lintels and two vertical jambs; outer edges of said horizontal lintels and said vertical jambs being furnished with an outer ring edge; corner ends between said horizontal lintel and said vertical jamb furnished with plugging grooves respectively for receiving a connection plate; flat plates on outer ring edges of said horizontal lintel and said vertical jamb extended inwards with arm plates and clamp plates respectively; lower flat plate of said outer ring edge extended with a vertical plate, an inner plate and a clamp plate; a given distance being left between said two clamp plates for receiving end part of said filter sheet so as to clamp the same in place; tail ends of said two clamp plates of said horizontal lintel furnished with a plurality of alternate and opposite corrugated positioning groves for holding two ends of said corrugated filter sheet respectively;
   a said filter sheet for screening dust, and top and bottom surfaces of said filter sheet covered with a metal screen, and being cut into a suitable length and width, and being bent into a corrugated sheet; both ends of said corrugated sheet to be mounted in said positioning grooves of said clamp plates in said horizontal lintel, while two sides thereof being mounted in a clamp space of said vertical jambs respectively;

a said connection plate, of which both ends being plugged into hollow grooves of two adjacent said horizontal lintel and vertical jamb so as to have said two parts connected together;

a resilient cover which being attached on top and bottom surfaces of said outer ring edge of said fixed frame.

2. A filter assembly of an air filter as claimed in claim 1, wherein said fixed frame has a horizontal lintel and a vertical jamb; said horizontal lintel having an outer ring edge which including two flat plates, and an upper flat plate thereof being in open condition before said filter sheet being assembled so as to facilitate said filter sheet to insert in said positioning grooves of said clamp plates.

3. A filter assembly of an air filter as claimed in claim 1, wherein said fixed frame has a horizontal lintel and a vertical jamb, of which each including an upper frame side and a lower frame side, and inner sides thereof having straight surfaces respectively; both ends of said corrugated filter sheet each being mounted with a separated upper fastening plate and a separated lower fastening plate before being inserted into a clamp space of said horizontal lintel.

4. A filter assembly of an air filter as claimed in claim 3, wherein said upper and lower fastening plates are to be inserted in said clamp space of said horizontal lintel, and tail ends of said fastening plates furnished with alternate and opposite corrugated positioning grooves, which being mated together with corrugated ends of said filter sheet respectively.

5. A filter assembly of an air filter as claimed in claim 1, wherein inner sides of said upper and lower frame sides of said horizontal lintel and said vertical jamb are straight surfaces respectively; one end of said filter sheet covered with an edge strip being inserted into said clamp space between said upper frame side and said lower frame side of said horizontal lintel; outer edge of said filter sheet being clamped with said two horizontal lintels and said two vertical jambs.

6. A filter assembly of an air filter as claimed in claim 5, wherein a cotton filter of said filter sheet is covered with a metal screen on both sides thereof; both ends of said filter sheet being covered with a resilient edge strip along edge of said cotton filter so as to have said edge strip and inner edge of said clamp space of said horizontal lintel contacted closely.

7. A filter assembly of an air filter as claimed in claim 1, wherein both top and bottom surfaces of said outer ring edge of said fixed frame is covered with a resilient rubber cover.

8. A filter assembly of an air filter as claimed in claim 1, wherein said top and bottom surfaces of said outer ring edge of said fixed frame are covered with a foam rubber belt along said frame side of said filter assembly.

9. A filter assembly of an air filter comprising:

a fixed frame including two horizontal lintels and two vertical jambs; inner edges of said upper frame sides of said horizontal lintel and said vertical jamb are furnished with an arm plate to clamp a filter sheet, and outer edge thereof having a small flat plate extended outwards; tail end of said small flat plate furnished with a cylindrical side post to be mounted with a resilient cover; said lower frame side having a vertical plate and an arm plate extended downwards, and a clamp space formed between said upper frame side and said lower frame side; inner edges of an upper clamp surface and a lower clamp surface having a short distance between one end of said vertical plate and said inner edges, and a positioning salient strip being furnished in said short distance; surface of said vertical plate inside said clamp space glued with a foam rubber plate; both sides of said frame having cut ends respectively, and a plugging groove formed between said positioning salient strip and said vertical plate surface of said upper and lower clamp surfaces; said plugging groove to be plugged with a L-shaped connection plate;

a filter sheet being used to filter dust; both upper and lower sides thereof covered with metal screens respectively; said filer sheet being cut into a suitable size and being formed into a corrugated sheet, of which both ends being plugged into said clamp space of said horizontal lintels, and end thereof being in contact with said foam rubber plate of said vertical plate; other two sides of said filter sheet mounted in said clamp space of said vertical jamb;

a connection plate being formed into L-shaped plate, of which both ends being plugged into end corners of an inner groove surface of said clamp space between said two frames so as to have said end corners of said two frames connected together; a resilient cover being covered over said small flat plate and said cylindrical side post of said upper frame side.

\* \* \* \* \*